(12) United States Patent
Heersink et al.

(10) Patent No.: US 11,663,370 B2
(45) Date of Patent: May 30, 2023

(54) AUTOMATED SYSTEM FOR GENERATING APPROXIMATE SAFETY CONDITIONS FOR MONITORING AND VERIFICATION

(71) Applicant: HRL Laboratories, LLC, Malibu, CA (US)

(72) Inventors: Byron N. Heersink, Thousand Oaks, CA (US); Michael A. Warren, Northridge, CA (US); Christopher Serrano, Whittier, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 218 days.

(21) Appl. No.: 17/115,770

(22) Filed: Dec. 8, 2020

(65) Prior Publication Data

US 2021/0365596 A1 Nov. 25, 2021

Related U.S. Application Data

(60) Provisional application No. 62/953,088, filed on Dec. 23, 2019.

(51) Int. Cl.
*G06N 3/04* (2006.01)
*G06F 21/88* (2013.01)

(52) U.S. Cl.
CPC .............. *G06F 21/88* (2013.01); *G06N 3/04* (2013.01)

(58) Field of Classification Search
CPC .. G06N 3/02; G06N 3/04; G06N 3/08; G06N 7/00; G06F 21/71; G06F 21/82; G06F 21/88
See application file for complete search history.

(56) References Cited

U.S. PATENT DOCUMENTS

| | | | | |
|---|---|---|---|---|
| 11,345,340 | B2 * | 5/2022 | Shalev-Shwartz | B60W 10/06 |
| 11,354,579 | B2 * | 6/2022 | Pudipeddi | G06N 3/0454 |
| 11,370,423 | B2 * | 6/2022 | Casas | G06N 3/0454 |
| 11,427,192 | B2 * | 8/2022 | Shalev-Shwartz | B60W 30/0956 |
| 11,436,019 | B2 * | 9/2022 | Pudipeddi | H04L 67/34 |
| 2021/0334630 | A1 * | 10/2021 | Lambert | G06N 3/063 |
| 2021/0397943 | A1 * | 12/2021 | Ribalta | G06V 10/774 |

OTHER PUBLICATIONS

Notification of and the International Preliminary Report On Patentability Chapter II for PCT/US2020/063853; dated Mar. 9, 2022.

(Continued)

*Primary Examiner* — Hosuk Song
(74) *Attorney, Agent, or Firm* — Tope-McKay & Associates

(57) ABSTRACT

Described is a system and method for generating safety conditions for a cyber-physical system with state space S, action space A and trajectory data labelled as either safe or unsafe. In operation, the system receives inputs and ten minimizes loss functions to cause a neural network to become a barrier function. Based on the barrier function, the system can then determine if the cyber-physical system is entering an usafe state, such that if the cyber-physical system is entering the usafe state, then the cyber-physical system is caused to initiate a maneuver to position the cyber-physical system into a safe state.

18 Claims, 8 Drawing Sheets

(56) References Cited

OTHER PUBLICATIONS

Richards, et al., "The Lyapunov Neural Network: Adaptive Stability Certification for Safe Learning of Dynamical Systems," Oct. 1, 2018, pp. 4-6.

Gurriet, et al., "A Scalable Controlled Set Invariance Framework with Practical Safety Guarantees," Dec. 13, 2019, pp. 2047-2048.

Cheng, et al., "End-to-End Safe Reinforcement Learning through Barrier Functions for Safely-Critical Continuous Control Tasks," Jul. 17, 2019, pp. 3389-3392.

Xiao, et al., "Decentralized Merging Control in Traffic Networks: A Control Barrier Function Approach," Apr. 18, 2019, pp. 2-4.

Notification of Transmittal and The International Search Report, and the Written Opinion of the International Searching Authority for PCT/US2020/063853; dated Apr. 6, 2021.

A. Taylor, et al., "Learning for safety-critical control with control barrier functions," arxiv.org, Cornell University Library, Ithaca, NY, Dec. 20, 2019, pp. 1-6.

Ames, A. D., Coogan, S., Egerstedt, M., Notomista, G., Sreenath, K., & Tabuada, P. (2019). Control Barrier Functions: Theory and Applications. IEEE European Control Conference, pp. 3420-3431. Naples, Italy: IEEE.

Ames, A. D., Grizzle, J. W., & Tabuada, P. (2014). Control Barrier Function based Quadratic Programs with Application to Adaptive Cruize Control. IEEE Conference on Decision and Control, pp. 6271-6278. Los Angeles, CA: IEEE.

Ames, A. D., Xu, X., Grizzle, J. W., & Tabuada, P. (2017). Control Barrier Function Based Quadratic Programs for Safety Critical Systems. IEEE Transactions on Automatic Control, 62(8), pp. 3861-3876.

Fisac, J. F., Lugovoy, N. F., Rubies-Royo, V., Ghosh, S., & Tomlin, C. J. (2019). Bridging Hamilton-Jacobi Safety Analysis and Reinforcement Learning. Retrieved from UC Berkeley: Jaime Fisac Papers: found at people.eecs.berkeley.edu/~jfisac/papers/Bridging_Safety_and_RL.pdf, pp. 8550-8556.

Ohnishi, M., Wang, L., Notomista, G., & Egerstedt, M. (2019). Barrier-Certified Adaptive Reinforcement Learning With Applications to Brushbot Navigation. IEEE Transactions on Robotics, 35(5), pp. 1186-1205.

Prajna, S. (2006). Barrier certificates for nonlinear model validation. Automatica, 42(1), pp. 117-126.

Prajna, S., & Jadbabaie, A. (2004). Safety Verification of Hybrid Systems Using Barrier Certificates. Hybrid Systems: Computation and Control, pp. 477-492. Philadelphia, PA: Springer.

Wieland, P., & Allgöwer, F. (2007). Constructive safety using control barrier functions. IFAC Symposium on Nonlinear Control Systems. pp. 462-467. Pretoria, South Africa: Elsevier.

Wu, G., & Sreenath, K. (2016). Safety-Critical Geometric Control for Systems on Manifolds Subject to Time-Varying Constraints. IEEE Transactions on Automatic Control, in review, pp. 2038-2044.

Zhao, H., Zeng, X., Chen, T., & Liu, Z. (2020). Synthesizing barrier certificates using neural networks. ACM International Conference on Hybrid Systems: Computation and Control. Sydney, Australia: ACM, pp. 1-11.

Response for European Regional Phase Patent Application No. EP20834076.0, dated Feb. 9, 2023.

* cited by examiner

400

| Method | False Safe Rate | False Unsafe Rate |
|---|---|---|
| 10 simulations of 2 steps forward | 3% | 5.5% |
| 10 simulations of 5 steps forward | 0% | 56.8% |
| 10 simulations of 10 steps forward | 0% | 98% |
| $h_\theta$ | 0% | 8.7% |

402    404

AUTOMATED SYSTEM FOR GENERATING APPROXIMATE SAFETY CONDITIONS FOR MONITORING AND VERIFICATION

CROSS-REFERENCE TO RELATED APPLICATIONS

This application claims the benefit of and is a non-provisional patent application of U.S. Provisional Application No. 62/953,088, filed on Dec. 23, 2019, the entirety of which is hereby incorporated by reference.

BACKGROUND OF INVENTION

(1) Field of Invention

The present invention relates to a machine learning system and, more specifically, to an automated system for generating safety conditions for monitoring and verification.

(2) Description of Related Art

This disclosure is directed to a process for yielding what are known as barrier functions. The notion of a barrier function in its most recent form began with the work of Prajna et al. (see the List of Incorporated Literature References, Literature Reference Nos. 6 and 7), although the notion is implicit in much earlier work. Barrier functions were introduced for proving the safety of hybrid and non-linear dynamical systems. The concept was introduced in control systems by Wieland et al. (see Literature Reference No. 8), and later reformulated in a number of ways, notably in the recent works of Ames et al. (see Literature Reference Nos. 2 and 3). See the work of Ames et al (2019) (see Literature Reference No. 1) for an overview of barrier functions and related formulations. For the latter, see also the work of Ohnishi et al. (see Literature Reference No. 5).

Control barrier functions have been used in ensuring safety in the control of a number of different systems. It is often the case that barrier functions are identified analytically (and, in particular, manually) according to the particular application, and there do not appear to be many versatile methods of constructing barrier functions for a general class of control systems. One exception is given in the work of Wu et al. (see Literature Reference No. 9), where a general method for constructing barrier functions is given for fully-actuated simple mechanical systems.

One relevant work is that of Fisac et al. (see Literature Reference No. 4). In that work, the authors formulated a method of approximating the globally safe region of the state space of a given control system. Their method does this by learning a fixed function of a contraction operator whose support approximates the globally safe region. While the method has a way of improving the approximation of the region, the weakness of the method is that it does not provide an absolute guarantee that the function's support indicates a truly safe region.

In contrast, the process as provided for in the present disclosure directly aims to learn barrier functions, which are guaranteed to be supported in the globally safe region of control systems. Thus the approximate barrier function yielded by the present approach is more likely to be supported in the globally safe region, and the method can readily be used in tandem with a satisfiability modulo theories solver to obtain genuine (not just approximate) barrier functions, from which one can identify a provably safe region of the state space of a system. On a more general level, another advantage of the approach provided by the present disclosure is that it naturally encompasses (and is more general than) that of Fisac et al. In other words, the approach of Fisac et al. can be viewed as a particular step of the present invention. So, for example, a function yielded by their approach can be found in the present, and then can be improved further in subsequent learning steps as described in further detail below.

The approach as provided for in the present disclosure is an unexpected improvement over the prior art because when researchers in control theory have considered barrier functions, they have focused on barrier functions that are explicitly identified and described rather than on learning barrier functions from data. For example, the closest work (i.e., Fisac et al.) is informed by the theory of contraction operators in connection with reinforcement learning. By contrast, because the approach of the present disclosure is explicitly directed instead toward trying to learn a barrier function, the approach is more likely to yield high-quality approximations. In particular, the functions learned by the present approach are more likely to be actual barrier functions (as one could potentially prove using a satisfiability modulo theories solver) and therefore any safety guarantees with respect to the outputs of the process will likely be of a higher quality. Likewise, in contrast with the manual and analytical approach taken in the literature on control theory, the present approach can potentially learn barrier functions for significantly more complex dynamical systems than could be feasibly handled manually.

Other work on using machine learning to learn barrier functions has been done, one by Zhao et al. (2020) (see Literature Reference No. 10), and another by Chang et al. (2020) (see Literature Reference No. 11). However, there are some important differences between these works and the present invention. First, the work of Zhao et al. applies to non-controlled dynamical systems, i.e., systems that do not have control variables, or alternatively systems for which such control variables are governed by an already set control policy. Additionally, the work of Zhao et al. requires a specific set of initial conditions which the learned barrier function aims to ensure the safety of. Also, the work of Chang et al. learns barrier functions together with a control policy as a way of helping the policy learn to be safe. In particular, the method aims only to learn barrier functions that certify the safety of the particular learned control policy.

Unlike these works, the system of the present disclosure learns barrier functions that are not restricted to certifying the safety of a particular set of initial conditions or control policy. Instead, the system of the present disclosure seeks to ensure the safety of the state space of a control system in general, and can potentially be used to find as much of the full safe region of the state space as possible, subject to the limitations due to data, dimensionality, and other aspects of a given application. Thus, given the issues with the prior art, the system of the present disclosure solves a continuing need for an improved and automated system for generating approximate safety conditions for monitoring and verification.

SUMMARY OF INVENTION

Described is a system and method for generating safety conditions for a cyber-physical system with state space S, action space A and trajectory data labelled as either safe or unsafe. In one aspect, the system comprises one or more processors and a memory. The memory is a non-transitory computer-readable medium having executable instructions encoded thereon, such that upon execution of the instructions, the one or more processors perform several operations, such as (1) receiving inputs, the inputs being at least one of a discrete dynamics model, a continuous dynamics model, a set of state space data points, a neural network, an initial safety function, and a method of determining an action at a given dynamical system state that is optimal according to the neural network; (2) if a discrete dynamics model is part of the input, then minimizing first and second loss functions then proceeding, otherwise proceeding; (3) causing the neural network $h_\theta$ to become the barrier function by minimizing a distinct loss function; and (4) outputting the barrier function.

In another aspect, the system causes the cyber-physical system to initiate a physical operation based on the barrier function.

In another aspect, the system performs an operation of determining if the cyber-physical system is entering an usafe state based on the barrier function, such that if the cyber-physical system is entering the usafe state, then causing the cyber-physical system to initiate a maneuver to position the cyber-physical system into a safe state.

In yet another aspect, minimizing the first and second loss functions includes operations of:

minimizing the first loss function that causes the neural network $h_\theta$ to learn an approximation of an initial safety function;

minimizing the second loss function that causes the neural network $h_\theta$ to satisfy a Bellman-like equation, which in turn modifies the neural network $h_\theta$, causing the neural network $h_\theta$ to be closer to being a barrier function than a previous version of itself;

performing an iteration of minimizing the second loss function to cause the neural network $h_\theta$ to satisfy a Bellman-like equation, which in turn further modifies the neural network $h_\theta$, causing the neural network $h_\theta$ to be closer to being a barrier function than a previous version of itself; and iterating minimization of the second loss function a predetermined number of times.

Further, in minimizing the distinct loss function, a loss function of $\ell_{\eta,\alpha,\delta_1,\delta_2}(\theta)$ is minimized for the discrete dynamics model and a loss function of $\ell_{\kappa,\alpha,\delta_1,\delta_2}(\theta)$ is minimized for the continuous dynamics model.

In yet another aspect, the discrete dynamics model is $\tau$: $S \times A \to S$, where S denotes a state space of the dynamical system, A denotes action space, and $\tau$ denotes a transition function that yields a state of the cyber-physical system following from an inputted state-action pair.

Further, the continuous dynamics model is $\dot{s}=f(s,a)$, where s denotes a state of the system, and $\alpha$ denotes a control action being taken, and $\dot{s}$ denotes a time derivative of s, and f denotes a vector field function that yields a time derivative of the state resulting from an inputted state-action pair.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed description of the various aspects of the invention in conjunction with reference to the following drawings, where.

DETAILED DESCRIPTION

Figure 1:
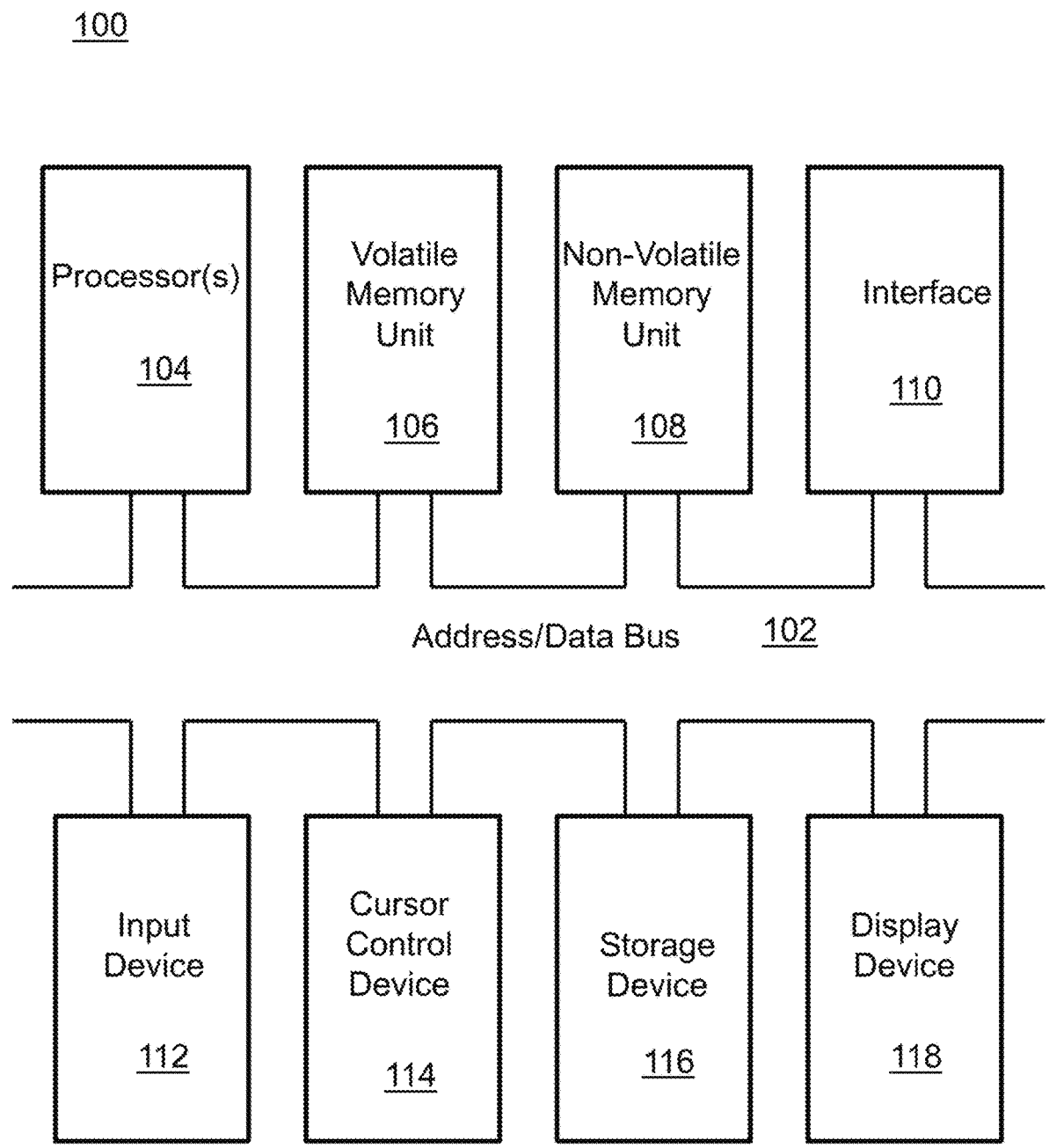
FIG. 1 is a block diagram depicting the components of a system according to various embodiments of the present invention.

The present invention relates to a machine learning system and, more specifically, to an automated system for generating safety conditions for monitoring and verification. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35

U.S.C. Section 112(f). In particular, the use of "step of" or "act of" in the claims herein is not intended to invoke the provisions of 35 U.S.C. 112(f).

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Ames, A. D., Coogan, S., Egerstedt, M., Notomista, G., Sreenath, K., & Tabuada, P. (2019). Control Barrier Functions: Theory and Applications. *IEEE European Control Conference* (pp. 3420-3431). Naples, Italy: IEEE.
2. Ames, A. D., Grizzle, J. W., & Tabuada, P. (2014). Control Barrier Function based Quadratic Programs with Application to Adaptive Cruize Control. *IEEE Conference on Decision and Control* (pp. 6271-6278). Los Angeles, Calif.: IEEE.
3. Ames, A. D., Xu, X., Grizzle, J. W., & Tabuada, P. (2017). Control Barrier Function Based Quadratic Programs for Safety Critical Systems. *IEEE Transactions on Automatic Control*, 62(8), 3861-3876.
4. Fisac, J. F., Lugovoy, N. F., Rubies-Royo, V., Ghosh, S., & Tomlin, C. J. (2019). *Bridging Hamilton-Jacobi Safety Analysis and Reinforcement Learning*. Retrieved from UC Berkeley: Jaime Fisac Papers: found at people.eecs.berkeley.edu/~jfisac/papers/Bridging_Safety_and_RL.pdf
5. Ohnishi, M., Wang, L., Notomista, G., & Egerstedt, M. (2019). Barrier-Certified Adaptive Reinforcement Learning With Applications to Brushbot Navigation. *IEEE Transactions on Robotics*, 35(5), 1186-1205.
6. Prajna, S. (2006). Barrier certificates for nonlinear model validation. *Automatica*, 42(1), 117-126.
7. Prajna, S., & Jadbabaie, A. (2004). Safety Verification of Hybrid Systems Using Barrier Certificates. *Hybrid Systems: Computation and Control* (pp. 477-492). Philadelphia, Pa.: Springer.
8. Wieland, P., & Allgöwer, F. (2007). Constructive safety using control barrier functions. *IFAC Symposium on Nonlinear Control Systems* (pp. 462-467). Pretoria, South Africa: Elsevier.
9. Wu, G., & Sreenath, K. (2016). Safety-Critical Geometric Control for Systems on Manifolds Subject to Time-Varying Constraints. *IEEE Transactions on Automatic Control*, in review.
10. Zhao, H., Zeng, X., Chen, T., & Liu, Z. (2020). Synthesizing barrier certificates using neural networks. *ACM International Conference on Hybrid Systems: Computation and Control*. Sydney, Australia: ACM.
11. Chang, Y.-C., & Gao, S. (2020). Stabilizing Neural Control Policies with Invariance Guarantee Using Self-Learned Lyapunov Critics. Unpublished.

(2) Principal Aspects

Various embodiments of the invention include three "principal" aspects. The first is a system for generating safety conditions for monitoring and verification. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. In various aspects, the computer system 100 can be embodied in any device(s) that operates to perform the functions as described herein as applicable to the particular application, such as a desktop computer, a mobile or smart phone, a tablet computer, a computer embodied in a mobile platform, or any other device or devices that can individually and/or collectively execute the instructions to perform the related operations/processes.

The computer system 100 may include an address/data bus 102 that is configured to communicate information. Additionally, one or more data processing units, such as a processor 104 (or processors), are coupled with the address/data bus 102 and/or associated memories. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA) or any other processing component operable for performing the relevant operations.

The computer system 100 is configured to utilize one or more data storage units (memories). The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
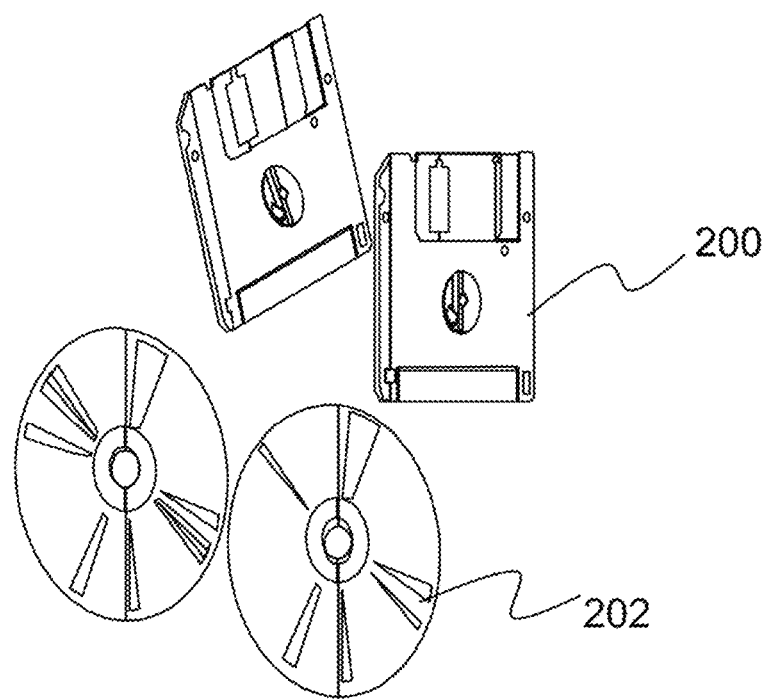
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

The present disclosure provides a novel machine learning technique to learn a function that effectively monitors the safety of a system in time. The function can be used to markedly improve a variety of systems. For example, the function can be used (1) to provide inputs to runtime monitoring systems for evaluating the safety of the system and determining whether or not to intervene, (2) for formal verification procedures that attempt to prove (or disprove) the safety of the algorithms being used to control the system, or (3) with systems for control or decision making. The kinds of systems that we consider are cyber-physical systems (CPS), including autonomous systems such as self-driving cars, autopilot systems, and so forth. Where the state space of the system is the set S, the machine learning approach yields as output a mathematical function $h: S \rightarrow \mathbb{R}$. Intuitively, this function measures, for each state $s \in S$, the degree $h(s)$ to which it is a globally safe state. Here, being a globally safe state s means that there exists a safe trajectory starting at s. This is in contrast with instantaneously safe states for which there may be no such safe trajectory (e.g., if the car is driving too fast in the direction of an obstacle, it may be safe now, but will not be so for long). In the intended semantics, those states s such that $h(s)>0$ are estimated to be globally safe. The procedure requires a sequence of labelled states where the labels indicate whether or not the state is considered as being instantaneously safe. These constitute the data required to use machine learning to obtain h.

The central premise of the invention is specifically a method of learning a type of functions called barrier functions for a range of control systems. Once found, barrier functions characterize globally safe regions of their respective state spaces and can therefore be used practically for safety monitoring, informing control/decision making, and for formal verification of system safety. There are not many general methods for finding barrier functions, with the traditional approach being a manual one, and the present procedure is the first to use machine learning to do so.

The system and method of the present disclosure invention has several distinct uses and advantages. In terms of usage, there are three primary modes in which the invention can be employed: (1) for (runtime) safety monitoring, (2) for informing a control/planning module, and (3) for formal verification.

First, the goal of safety monitoring is to provide an indication of the safety of a system at a given time. In particular, it is often employed at runtime and when a state is encountered that is deemed to be too close to being unsafe, the monitor raises a flag and allows a redundancy/backup/failsafe system to take over control of the system. This operation can be implemented into a variety of applications, a non-limiting example of which includes autonomous vehicles. As a specific example scenario, for an autonomous car, if the safety monitor determines that the vehicle is too close to driving out of the prescribed driving lane, it might take over steering to move the vehicle away from the lane marker. In the notation above, given a threshold value $\delta > 0$, the invention can be used for runtime monitoring by raising the monitoring flag whenever a state s is encountered such that $h(s) < \delta$. This can be employed on autonomous systems, as well as on human-operated systems. Thus, in some aspects, the invention can be used as a safety monitoring tool for cyber-physical systems, such as an automobile, air or spacecraft, etc., such that it is employed either on the platform or else on a remote location in order to actively monitor the safety of the platform.

Second, the invention can be employed in connection with automatic control or planning functions. In these cases, at each time t the system is in a state $s_t$ and an action $a_t$ is selected from a set A of actions. For example, in an autonomous car, an action could be to adjust the steering angle or throttle and in an autonomous aircraft it might be to adjust the ailerons. In this setting the function h above can be used to filter acceptable actions as follows. Assume that the system is provided an estimate $\tau(s,a)$ of the state that will be reached by taking action a from s. Then, given a mechanism for sampling candidate actions a, the system can be operated by first evaluating whether or not $h(\tau(s,a)) > \delta$, for a fixed threshold value $\delta$. If the inequality holds, then select action a, otherwise sample a new candidate action a' and repeat this process. Thus, the system can be implemented as an automatic control or decision making module on a cyber-physical system, wherein it consumes state information obtained from sensor or other modules and produces outputs which are routed either to actuators or else to further modules.

Finally, the condition that $h(s) > \delta$, for a threshold value $\delta$, can be employed as an approximate definition of what it means for a state s to be (globally) safe. Therefore, this condition can be employed as a safety specification for formal verification to obtain mathematical guarantees on system behavior with respect to this condition, or examples where the condition is violated that might indicate a safety failure. Thus, in some aspects, the invention operates to produce a function (the neural network used to approximate the barrier function) that can be used by an external tool, such as a satisfiability modulo theories solver or a computer proof assistant as a specification against which to carry out formal verification of a cyber-physical system control or decision making module.

As can be appreciated by those skilled in the art, the process as described herein can be incorporated into a variety of systems, including applications for advanced driver assistance, flight management, flight control, autonomous driving, and others. For each of these domain areas, the invention can be employed to provide safety monitoring capabilities, improved control capabilities, or for purposes of formal verification (e.g., in connection with a more general verification and validation regime). Specific details are provided below.

(4) Specific Details of Various Embodiments

As noted above, the present disclosure provides an automated system for identifying a function that effectively monitors the safety of a system in time. As a preliminary matter, the notion of barrier functions for both discrete and continuous time control systems must be defined. Suppose that there is first a discrete time control system defined by a transition function $\tau: S \times A \to S$, where S and A are the state and action spaces of the system, respectively. So, taking an action $a \in A$ at state $s \in S$ leads to the subsequent state $\tau(s,a)$. The transition function can be known or learned from system trajectories. Assume also that there is a subset $K \subseteq S$ which contains all of the states that are considered instantaneously safe. It is desired that the state of the system never exits K. A barrier function is a function $h: S \to \mathbb{R}$ such that there exists a constant $\eta \in [0,1)$ in which $(1-\eta)h(s) \leq \max_{a \in A} h(\tau(s,a))$ for all $s \in K$ satisfying $h(s) > 0$, and $h(s) \leq 0$ if $s \notin K$. For such a function, the states $s \in S$ such that $h(s) > 0$ are known to be globally safe; that is, starting at s, it is possible to keep the system state in K indefinitely in the future.

To define barrier functions for continuous time control systems, suppose as before that S and A are the state and action spaces, and $K \subseteq S$ is the set of safe states. Assume that $S \subseteq \mathbb{R}^n$ and $A \subseteq \mathbb{R}^m$, and that the dynamics of the system are defined by the system of differential equations $\dot{s} = f(s,a)$, where $f: S \times A \to \mathbb{R}^n$ is a Lipschitz continuous function. Then a barrier function for this system is a function $h: S \to \mathbb{R}$ such that there exists a constant $\kappa > 0$ in which $\nabla h(s) \cdot f(s,a) + \kappa h(s) \geq 0$ for all $s \in K$ satisfying $h(s) > 0$, and $h(s) \leq 0$ if $s \notin K$. Then as before, the states $s \in S$ such that $h(s) > 0$ are known to be globally safe.

Next, described are the approaches to learning barrier functions from data in both the discrete and continuous settings. Begin with the discrete setting. Assume the control system is defined by the transition function $\tau: S \times A \to S$ and safe set K as described above. Next, suppose that there exists system state data $D = \{x_j : j=1, \ldots, N\} \subseteq S$ obtained in some manner, e.g., obtained from previous system simulations, random state space sampling, or real world data collection. Then D can be divided into the sets $K' = D \cap K$ and $U = D \cap (S \backslash K)$, so that K' consists of the safe data points and U consists of the unsafe data points. Next, let $h_\theta: S \to \mathbb{R}$ be a neural network with which it is desired to learn a barrier function for the system.

Figure 7:
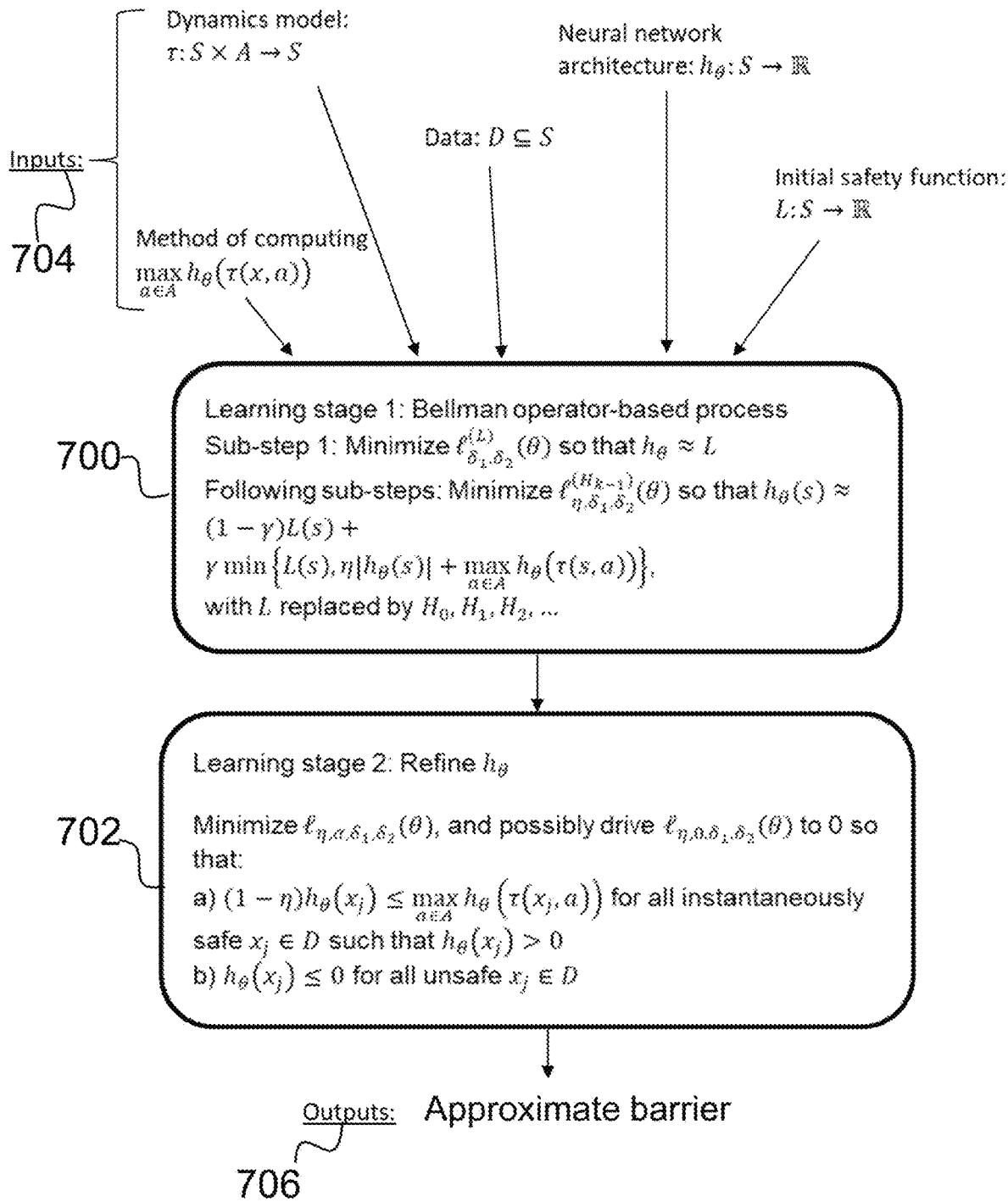
FIG. 7 is a diagram outlining the barrier function learning process.

As shown in FIG. 7, the learning process in the discrete setting is made up of two fundamentally different learning stages; Learning Stage One 700 and Learning Stage Two 702. Learning Stage One 700 involves learning with a contractive Bellman operator, similar to Q-learning and the work of Fisac et al. (see Literature Reference No. 4). In that work, the goal is to learn a function $V: S \to \mathbb{R}$ that satisfies the Bellman equation:

$$V(s) = (1-\gamma)L(s) + \gamma \min\left\{L(s), \max_{a \in A} V(\tau(s,a))\right\},$$

where $\gamma \in (0,1)$ is a discount factor and $L: S \to \mathbb{R}$ is a differentiable function that satisfies $L(s) \geq 0$ if and only if $s \in K$. For $\gamma \approx 1$, the set $\{s \in S : V(s) > 0\}$ gives an approximation of the globally safe set, which improves as $\gamma \to 1$. The first stage of the learning process is a generalization of this basic idea. Briefly, the above Bellman equation is generalized to relate it to the barrier function conditions, and allowing for replacements of the function L in the equation. More details are in the following paragraphs.

It should be noted that several example inputs 704 are provided in FIG. 7. The nature of the inputs 704 will vary depending on the particular application in which the system is employed, although each of these inputs must be provided. For example, in some cases the maximum of $h_\theta(r(x, a))$ with respect to actions a can be calculated directly (i.e., when the set of actions is sufficiently small), but in other cases it may be estimated using a machine learning algorithm.

As in Fisac et al., the present process utilizes a differentiable function $L: S \to \mathbb{R}$ that satisfies the weaker condition that $L(s)>0$ only if $s \in K$. This function can be learned or given, and is considered as an upper bound and a first approximation to the barrier function. Also, fixed are a barrier function constant $\eta \in [0,1)$, a discount factor $\gamma \in (0,1)$, and other constants $\delta_1, \delta_2 > 0$. With these constants in place, the learning process can be described. The first step is to let $h_\theta$ learn an approximation of the function L; to do so, minimize the loss function $$\ell^{(L)}_{\delta_1,\delta_2}(\theta) = \sum_{x_j \in U} \max\{0, h_\theta(x_j) + \delta_1, -h_\theta(x_j) - \delta_2\} + \sum_{x_j \in K'} (h_\theta(x_j) - L(x_j))^2.$$

Note that the purpose of the first sum is to ensure that the values of $h_\theta$ at unsafe points are in the interval $[-\delta_2, -\delta_1] \subseteq (-\infty, 0]$. The manner in which this minimization is carried out will be clear to one skilled in the art.

The goal of the subsequent learning steps is to have $h_\theta$ learn to satisfy $$h_\theta(s) \approx (1-\gamma)L(s) + \gamma \min\left\{L(s),\ \eta|h_\theta(s)| + \max_{a \in A} h_\theta(\tau(s,a))\right\}$$

for all $s \in K$. This expression corresponds to a Bellman operator, which is contractive if $$\gamma \in \left(0, \frac{1}{1+\eta}\right),$$

of which $h_\theta$ seeks to learn a fixed function. Note that in most cases, equality in this expression does not imply that $h_\theta$ is a barrier function. Intuitively, $h_\theta$ provides a function that is closer to being a barrier function than L. For this reason, periodically replace L in the above equation by the current status of $h_\theta$. Assuming equality in the above expression can always be attained, this process amounts to finding a sequence of functions $L \geq H_1 \geq H_2 \geq \ldots$, where $H_1$ satisfies $$H_1(s) = (1-\gamma)L(s) + \gamma \min\left\{L(s),\ \eta|H_1(s)| + \max_{a \in A} H_1(\tau(s,a))\right\}$$

and the subsequent functions $H_k$, $k \geq 2$, satisfy $$H_k(s) = (1-\gamma)H_{k-1}(s) + \gamma \min\left\{H_{k-1}(s),\ \eta|H_k(s)| + \max_{a \in A} H_k(\tau(s,a))\right\}.$$

Optionally, one may let γ approach 1, as in the work of Fisac et al., while learning any of the functions $H_k$.

In theory, when all functions $H_k$ are bounded below by a single constant, the limit $\lim_{k\to\infty} H_k$ converges to a barrier function. Practically, exact equality in the above expression cannot be ensured; thus, the process only seeks to minimize the difference between the two sides of the equality. So a goal is to learn a sequence of functions $L=H_0, H_1, H_2, \ldots$ that satisfy $$H_k(s) \approx (1-\gamma)H_{k-1}(s) + \gamma \min\left\{H_{k-1}(s),\ \eta|H_k(s)| + \max_{a \in A} H_k(\tau(s,a))\right\}.$$

More precisely, at step k (where $H_{k-1}$ has just been learned), minimize the loss function $$\ell^{(H_{k-1})}_{\eta,\delta_1,\delta_2}(\theta) = \sum_{x_j \in U} \max\{0, h_\theta(x_j) + \delta_1, -h_\theta(x_j) - \delta_2\} + \sum_{x_j \in K'} \Big(h_\theta(x_j) - (1-\gamma)H_{k-1}(x_j) - \gamma \min\left\{H_{k-1}(s),\ \eta|h_\theta(x_j)| + \max_{a \in A} h_\theta(\tau(x_j,a))\right\}\Big)^2.$$

At a certain number of learning epochs as determined by the user and based on performance or other criteria, stop and define the current status of $h_\theta$ to be $H_k$. After a number of iterations k=n of replacing L in the Bellman equation, this stage in the learning process is terminated. One thing to note is that one of the inputs to the procedure is an algorithm for computing exactly or else approximating the maximum over A in the above loss function (as mentioned above, this could be calculated directly when the set A is sufficiently small, but can also be approximated using a separate machine learning procedure in other cases). In the reduction to practice described below, A in the maximum is replaced by a fixed finite subset of A. However, note that the calculation of this maximum can be formulated itself as a problem of reinforcement learning and the techniques of that field can be applied to this end. Other approximations are also possible. The manner in which the above learning stage is carried out in practice will be evident to one skilled in the art.

The second and final stage in the learning process (i.e., Learning Stage Two 702) is used to refine $h_\theta$ to satisfy the barrier function properties more precisely by changing the loss function to $$\ell_{\eta,\alpha,\delta_1,\delta_2}(\theta) = \sum_{x_j \in U} \max\{0, h_\theta(x_j) + \delta_1, -h_\theta(x_j) - \delta_2\} + \sum_{x_j \in K'} \Big(ReLU(-h_\theta(x_j) - \delta_2) - \alpha h_\theta(x_j) + ReLU\Big(h_\theta(x_j) - \eta|h_\theta(x_j)| - \max_{a \in A} h_\theta(\tau(x_j,a))\Big)\Big).$$

This function more directly pushes $h_\theta$ toward satisfying the barrier function properties and generates as an output the approximate barrier function 706. Note that the constant α is positive and close to 0, and the term $-\alpha h_\theta(x_j)$ encourages larger support $\{s \in S: h_\theta(s)>0\}$ with the idea of finding a larger globally safe set. Generally, it may be necessary to change α during the stage. In particular, α typically starts out at a larger value and decreases as time goes on. This completes the description of the learning process for discrete control systems. The manner in which the above learning stage is carried out in practice will be evident to one skilled in the art.

Described below is the barrier function learning process for continuous control systems. Assume the control system is defined by the system of differential equations ṡ=f(s,a) and the safe set K is as described above. Note that by defining a discrete approximation for the system, one can use either of the learning stages in the discrete case in the continuous case as well. Indeed, the transition function τ: S×A→S can be defined so that if one chooses action a∈A at state s∈S, then τ(s,a) is an approximation of the state of the system (which can be obtained by, e.g., the Euler or Runge-Kutta methods) after some fixed time gap.

After these stages have been utilized, the main learning stage is as follows. As before, let D={$x_j$: j=1, ..., N}⊆S be a data set, which is divided into instantaneously safe K'=D ∩ K and unsafe U=D∩(S\K) data points; let $h_\theta$:S→$\mathbb{R}$ be a neural network with which to learn a barrier function; and let α,$δ_1$, $δ_2$>0 be constants. Additionally, fix the barrier function constant κ>0. The neural network $h_\theta$:S→$\mathbb{R}$ then learns according to the loss function $$\ell^{cts}_{\kappa,\alpha,\delta_1,\delta_2}(\theta) = \sum_{x_j \in U} \max\{0, h_\theta(x_j)+\delta_1, -h_\theta(x_j)-\delta_2\} +$$
$$\sum_{x_j \in K'} \left( ReLU\left(-\max_{a \in A}\{(\nabla_x h_\theta)(x_j)\cdot f(x_j, a) + \kappa|h_\theta(x_j)|\}\right) - \alpha h_\theta(x_j) \right).$$

Similar to the second stage in the discrete case, this loss function directly pushes $h_\theta$ to satisfy the barrier function properties while the term −α$h_\theta$($x_j$) encourages larger support. Also, the constant α may start out at a larger value and decrease as time goes on. This completes the description of the learning process in the continuous case. The manner in which the above learning stage is carried out in practice will be evident to one skilled in the art.

Next, described below are several example applications in which the system has been reduced to practice. In a first example, consider a control system (i.e., controlled dynamical system) with state space S=$\mathbb{R}^2$, action space A=[−½, ½], transition function T:S×A→S defined by T((x, v), a)=(x+v, x+v+a), and instantaneously safe set K={(x,v)∈ $\mathbb{R}^2$:|x|≤1}. Intuitively, the triple (x,v,a) can be thought of as (position, velocity, acceleration) of an object, where the acceleration is controlled; and the point (x,v)=(0,0) is an unstable fixed point. The ground truth globally safe set can be shown to be {(x,v)∈$\mathbb{R}^2$:|x+v|≤½}, and one can therefore accurately assess the effectiveness of the approach in this example.

Figure 3:
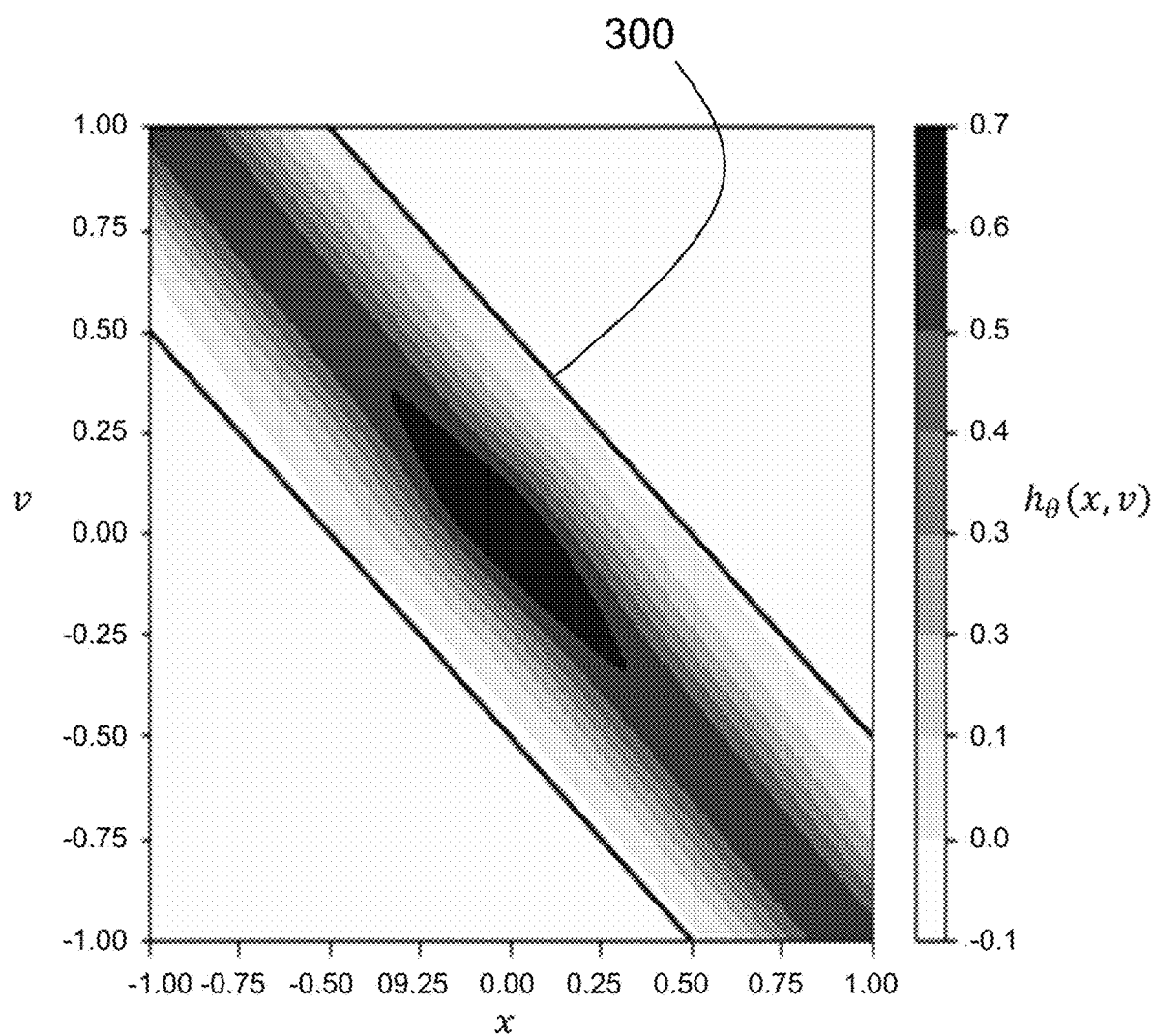
FIG. 3 is a graph depicting a function $h_\theta$ resulting from a learning process according to various aspects of the present invention.

The data set D used to learn an approximate barrier function consists of states from 10,000 trajectories of the system, each of which were terminated at the first state outside of K, and the initial point and all actions were chosen uniformly at random from {(x,v)∈$\mathbb{R}^2$:|≤1, |v|≤1} and respectively. The transition function τ: S×A→S used in the loss function in the learning process was a learned approximation of T. The neural network $h_\theta$:$\mathbb{R}^2$→$\mathbb{R}$ used to learn the approximate barrier function was fully connected, had hidden 2 layers with 20 nodes each, and had hyperbolic tangent nonlinearities. In this case, only the second stage of the discrete time barrier function learning process was used. In particular, the experiment minimized the loss function $\ell_{\eta,\alpha,\delta_1,\delta_2}(\theta)$, with η=0.5, $\delta_1$=0.01, $\delta_2$=0.1, and various values for α. The initial value for a was chosen to be sufficiently large so that $h_\theta$ learned to be generally positive in the instantaneously safe region of the state space. Subsequently a was periodically decreased in order for $h_\theta$ to better conform to the barrier function properties until $\ell_{0.5,0,0,0.01,0.1}(\theta)$ was brought to 0. For the purpose of computing the maximum in the loss function, A was restricted to the subset {−1,0,1}. The function $h_\theta$ resulting from the learning process is depicted in FIG. 3. Specifically, FIG. 3 depicts the values of the learned barrier function 300 over the state space of the system together with the (analytically known) ground truth safety boundary 300 (i.e., the boundary between globally safe and non-globally safe states). In this case, the learned barrier function correctly under-approximates the actual safe set.

Figure 4:
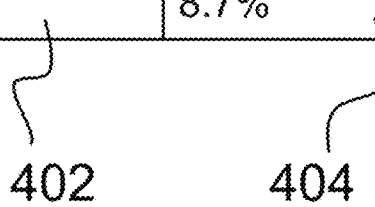
FIG. 4 is a table providing statistics from an example evaluation of the system according to various aspects of the present invention.

The process evaluated the accuracy of how well $h_\theta$ indicates what the globally safe region is since it is known. Specifically, the value of $h_\theta$ was computed over a 200×200 grid of points over the set of instantaneously safe states {(x,v)∈$\mathbb{R}^2$:|x|≤1, |v|≤1}, and evaluated whether $h_\theta$ correctly identified the points as globally safe or unsafe, corresponding to $h_\theta$(s)>0 and $h_\theta$(s)≤0, respectively. The statistics of this evaluation are given in the table 400 depicted in FIG. 4.

Notably, the false safe rate for $h_\theta$ 402, which is the percentage of globally unsafe points that are incorrectly indicated by $h_\theta$ as being globally safe, was 0%. This means that $h_\theta$ is particularly cautious and cannot mislead the control system into moving to an unsafe state. On the other hand, the false unsafe rate for $h_\theta$ 404, that is, the percentage of globally safe points that are incorrectly indicated by the barrier function as being globally unsafe, is 8.7%. This shows that $h_\theta$ is somewhat conservative. However, the table 400 compares the results of $h_\theta$ with some baseline methods of determining the safety of states. These methods take a given state, and generate some number of random simulations of a particular length starting at that state, and label a state as being globally safe if and only if at least one of the simulations did not terminate in an unsafe state. As the table 400 indicates, $h_\theta$ was more accurate at determining the globally safe states, while at the same time correctly identifying all unsafe states. The procedure was implemented in the Python programming language and the manner of implementation will be familiar to one skilled in the art.

Figure 5:
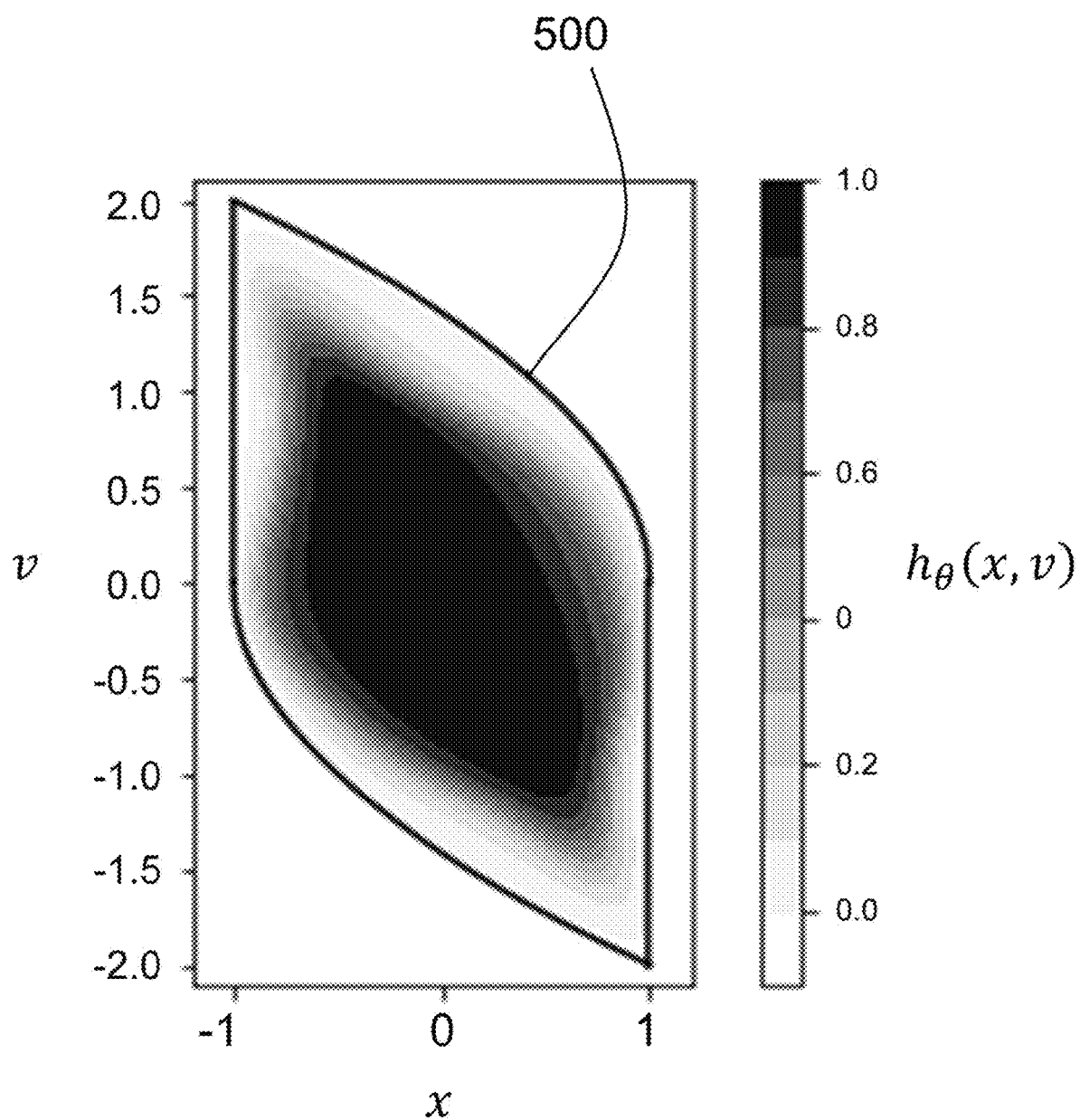
FIG. 5 is a graph depicting the function $h_\theta$ from a learning process according to various aspects of the present invention.

For a second example, consider a double integrator, a continuous time dynamical system having state space S= $\mathbb{R}^2$, action space A=[−1,1], has function f:S×A→$\mathbb{R}^2$ defined by f((x,v), a)=(v,a) so that the dynamics are given by the system of differential equations (ẋ, v̇)=(v,a), and instantaneously safe set K={(x,v)∈$\mathbb{R}^2$:|x|≤1}. As in the previous example, (x,v,a) can be thought of as (position, velocity, acceleration). The ground truth globally safe set is known in this example as well; it can be shown to be {(x,v)∈ $\mathbb{R}^2$:|x|≤1, −√(2(x+1))≤v≤√(2(1−x))}. The data set D used to learn an approximate barrier function consists of a 240×800 grid of points that uniformly spans the set {(x,v)∈ $\mathbb{R}^2$:|x|≤1.2, |v|≤4}. The neural network $h_\theta$:$\mathbb{R}^2$→$\mathbb{R}$ used was fully connected, had hidden 2 layers with 20 nodes each, and had hyperbolic tangent nonlinearities. For this case, the learning process consisted in minimizing the loss function $\ell^{cts}_{\kappa,\alpha,\delta_1,\delta_2}(\theta)$ for θ=4, $\delta_1$=0.01, $\delta_2$=0.1, and various values for α. As in the previous example, a was initially set at a sufficiently large positive number, and was decreased throughout the process until $\ell^{cts}_{4,0,0,0.01,0.1}(\theta)$ was equal to 0. For the purpose of computing the maximum in the loss function, A was again restricted to the subset {−1,0,1}. The resulting function $h_\theta$ is depicted in FIG. 5. Specifically, FIG. 5 depicts the values of the learned barrier function over the state space of the system and the corresponding ground truth safety boundary 500. Note that the ground truth globally safe region is known in this case as well, and it is shown qualitatively that $h_\theta$ accurately identifies that region.

For a third and final example, consider the setting in which a vehicle is being driven in a straight road, with the goal of learning a barrier function indicating whether the vehicle will be able to remain in the lane. This situation was modeled as a discrete time control system as follows. Let the state space be $$S = \{(x, \theta, s) \in \mathbb{R}^3 : |x| \leq W, |\theta| \leq \frac{\pi}{2}, 0 \leq s \leq s_{max}\},$$

where W=4.2 m, and $$s_{max} = 65 \frac{m}{s}.$$

The variable x represents the location of the center of the vehicle on the lane; the span of the lane with respect to x is [−w, w], where w=3.7 m. Also, the variable $\theta$ is the angle between the direction the vehicle is facing and the direction parallel to the road; and s is the speed of the vehicle, which is assumed to be nonnegative and have maximum value $s_{max}$. Additionally, let the vehicle's length and width be 4.12379394 m and 1.94305298 m; and for a given vehicle state (x, $\theta$, s), one can easily compute the x-coordinates of the 4 corners of the vehicle, which are denoted as $x_{ur}$, $x_{ul}$, $x_{lr}$, $x_{ll}$. Next, let the action space be A={($\phi$, a)$\in \mathbb{R}^2$:|$\phi$|≤$\phi_{max}$, $a_{min} \leq a \leq a_{max}$}, where $$\phi_{max} = \frac{50\pi}{180}, a_{min} = -4.5 \frac{m}{s^2}, \text{ and } a_{max} = 2.25 \frac{m}{s^2}.$$

The variable $\phi$ denotes the steering angle of the vehicle and a denotes the acceleration. Note that the steering angle must be restricted in such a way that the centripetal acceleration $$\frac{s^2}{r}$$

(r being the radius of the vehicle path resulting from the steering angle), is bounded by the product $\mu g$ of the coefficient of friction $\mu$=0.7 between the vehicle and the road and gravitational acceleration $$g = 9.8 \frac{m}{s^2}.$$

Let the instantaneously safe region be the set K={(x, $\theta$, s)$\in$S:w≤$x_{ur}$, $x_{ul}$, $x_{lr}$, $x_{ll}$≤w} of states where all four corners of the vehicle are in the lane.

Next, define the transition function $\tau$:S×A→S so that at a given state (x, $\theta$, s)$\in$S with a chosen action ($\phi$, a)$\in$A, $\tau$((x, $\theta$, s), ($\phi$, a)) is the state of the vehicle after a time gap, which was chosen to be ¼ s. Note that x can be analytically computed. The data set D used to learn an approximate barrier function was obtained by sampling 100,000 states uniformly at random over S. As in the other examples, the neural network $h_\theta$:$\mathbb{R}^2$→$\mathbb{R}$ used was fully connected, had hidden 2 layers with 20 nodes each, and had hyperbolic tangent nonlinearities. For this example, both stages of the discrete time learning process were used. Let $\gamma$=0.75, $\eta$=0.5, $\delta_1$=0.01, and $\delta_2$=0.4, and define the initial function L:S→$\mathbb{R}$ by $$L(x, \theta, s) = 1 - \frac{\max\{x_{ur}^2, x_{ul}^2, x_{lr}^2, x_{ll}^2\}}{w^2} - \delta_1.$$

The learning process is started by minimizing the loss function $\ell_{0.01,0.4}^{(L)}(\theta)$ so that $h_\theta \approx L$. The process was continued by performing several iterations of minimizing $\ell_{0.5,0.01,0.4}^{(H_{k-1})}(\theta)$ to push $h_\theta$ to be closer to satisfying the barrier function properties. Lastly, the process performed a number of steps of minimizing the loss function $\ell_{0.5,\alpha,0.01,0.4}(\theta)$ (with $\alpha \approx \theta$) until $\ell_{0.5,0,0.01,0.4}(\theta)$=0 to push $h_\theta$ to satisfy the barrier function properties more precisely. For the purpose of computing the maximum in the loss function, $\phi$ was restricted to the set {0, ±3$^{-k}\phi_{max}$:k=0,1,2,3, 4} and $\alpha$ to $$\left\{a_{min}, \frac{a_{min}}{2}, 0, a_{max}\right\}.$$

Figure 6:
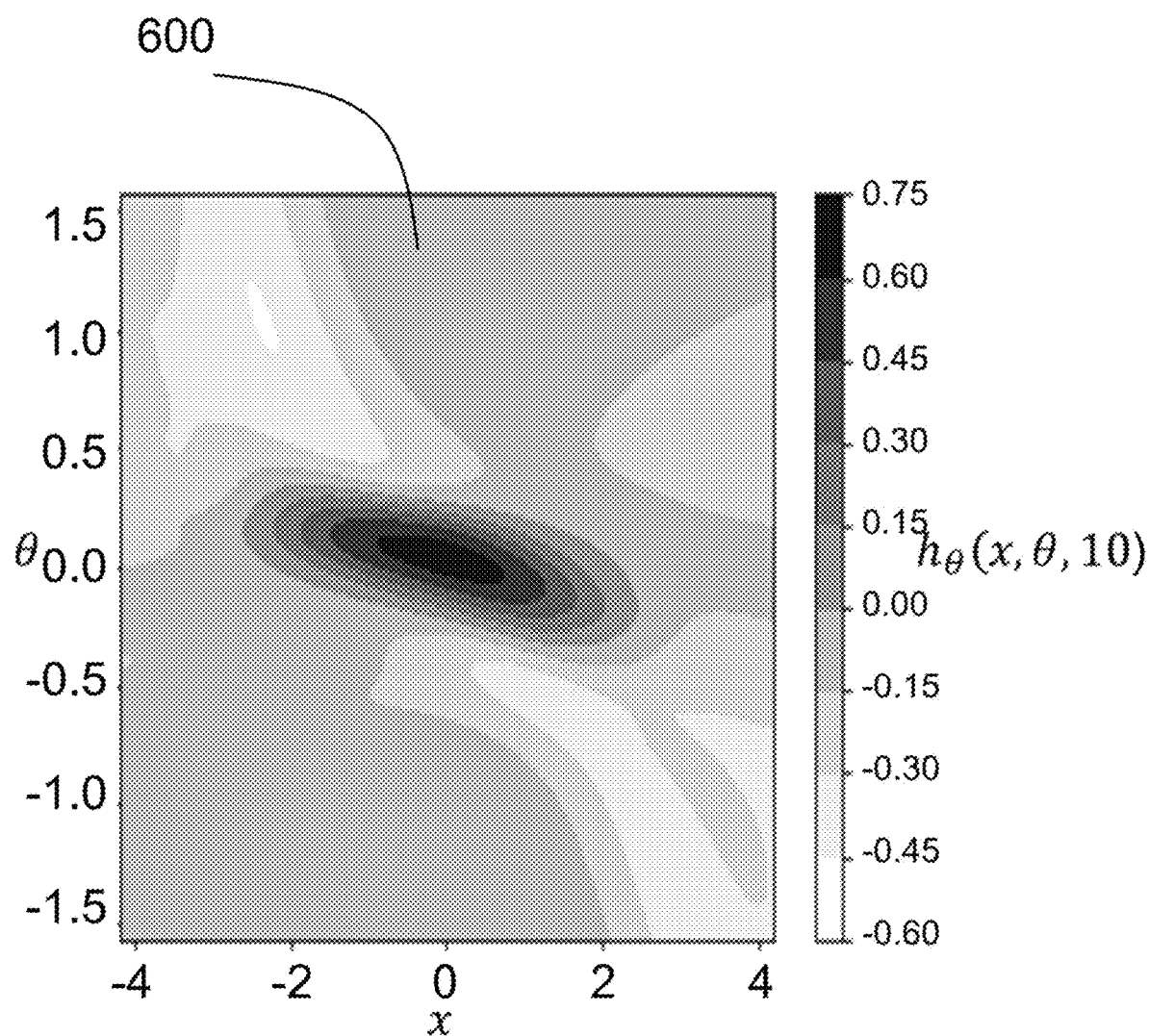
FIG. 6 is a graph depicting the value of $h_\theta$ (x, θ, s) with respect to (x, θ) under the assumption that $$s = 10\frac{m}{s};$$

Based on the results of a vehicle simulation, the resulting function $h_\theta$ empirically appears to successfully indicate all globally unsafe states, though is particularly cautious. FIG. 6 depicts the value of $h_\theta$ (x, $\theta$, s) with respect to (x, $\theta$) under the assumption that $$s = 10 \frac{m}{s}.$$

Specifically, FIG. 6 depicts the values of the learned barrier function over a portion of the state space of the system.

The neural network architecture used in this case is the same as in the foregoing examples. As a general rule of thumb one should regard the task of learning a barrier function for a particular dynamical system as being bounded below by reinforcement learning tasks for the same system. As such, architectures that are sufficient, for a fixed dynamical system, for reinforcement learning are a good starting point for barrier function learning architectures. Similar remarks apply to the question of data volume sufficient for learning barrier functions.

There are several additional options for the loss functions that can be used in the process. In particular, loss functions can be made that are alternatives to $\ell_{\eta,\alpha,\delta_1,\delta_2}(\theta)$ and $\ell_{\kappa,\alpha,\delta_1,\delta_2}^{cts}(\theta)$, which weight the terms that penalize violations of the barrier function condition by the value of $h_\theta$. This causes the learning to exhibit more stability in some cases. In addition, loss functions can be created for continuous time control systems that are formed from Bellman-like operators, analogously to $\ell_{\eta,\delta_1,\delta_2}^{(H_{k-1})}(\theta)$, that work directly with the continuous dynamics and do not require a discrete dynamics model for the system. These loss functions are to be used prior to the stage where $\ell_{\kappa,\alpha,\delta_1,\delta_2}^{cts}(\theta)$ is used, and are better able to direct a neural network to learn an approximate barrier function at the beginning of the process.

(4.1) Control of a Device

Figure 8:
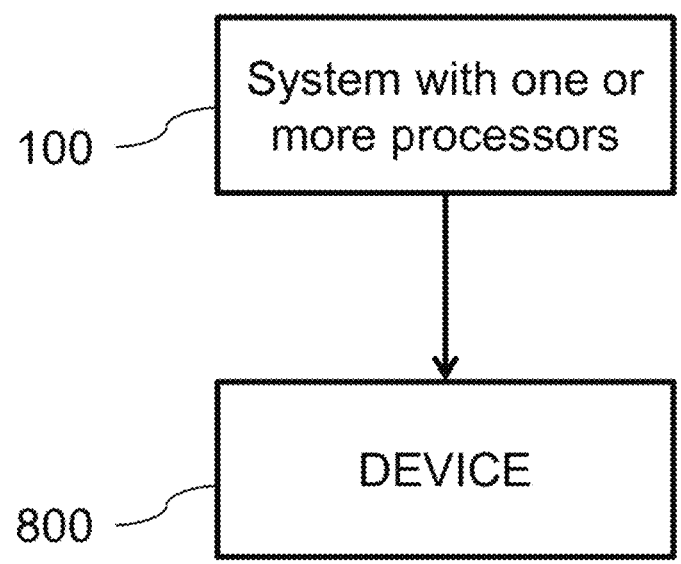
FIG. 8 is a block diagram depicting control of a device according to various embodiments.

As shown in FIG. 8, the system 100 may be used to control a device 800 (e.g., a mobile device display, a virtual reality display, an augmented reality display, a computer monitor, a motor, a machine, a drone, a camera, an autonomous vehicle, etc.) based on the barrier function. For example, the device 800 may be controlled to cause the device to move or otherwise initiate a physical action based on the barrier function. By way of example, if the barrier function determines, through being evaluated on the present (estimated) system state based on sensor readings and outputs of sensor fusion/state estimation algorithms employed on the platform, that the autonomous vehicle is projected to move out of a driving lane (state is unsafe), the system 100 will cause the vehicle to alter course (steer, brake, accelerate, etc.) to move and maintain the vehicle within the driving lane or otherwise safe state. Analogous examples can be imagined in cases where the barrier functions correspond to different safety properties. Additionally, the outputs of the barrier function could be used together in the loop with the control system as part of a learning process to better regulate or optimize the control of the system for safe performance.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A method for generating control barrier functions for ensuring safety conditions for an autonomous vehicle with state space S, action space A and trajectory data labelled as either safe or unsafe, the method comprising an act of:
   causing one or more processors to execute instructions encoded on a memory such that upon execution of the instructions, the one or more processors perform operations of:
      receiving inputs, the inputs being a discrete or continuous dynamics model, a set of state space data points, a neural network $h_\theta$, an initial safety function L, and a method of determining an action a at a given dynamical system state s that is optimal according to the neural network $h_\theta$;
      if a discrete dynamics model is part of the input, then minimizing a first loss function and a second loss function then proceeding, otherwise proceeding;
      wherein the first loss function minimizes $\ell_{\delta_1,\delta_2}^{(L)}(\theta)$ such that $h_\theta \approx L$, and wherein the second loss function minimizes $\ell_{\eta,\delta_1,\delta_2}^{(H_{k-1})}(\theta)$ such that $h_\theta(s) \approx (1-\gamma)L(s) +$ $$\gamma \min\left\{L(s), \eta|h_\theta(s)| + \max_{a \in A} h_\theta(\tau(s,a))\right\},$$

with L replaced by $H_0, H_1, H_2, \ldots$,
      wherein $\ell$ denotes a loss function, $\delta$ denotes a fixed threshold value, $\eta$ represents a barrier function constant, k represents a number of iterations, $\gamma$ denotes a discount factor, and $\tau$ represents a transition function;

refining the neural network $h_\theta$ to become a control barrier function by minimizing $\ell_{\eta,\alpha,\delta_1,\delta_2}(\theta)$ such that $$(1-\eta)h_\theta(x_j) \leq \max_{a \in A}(\tau(x_j, a))$$

for all instantaneously safe $x_j \in D$ such that $h_\theta(x_j) > 0$ and $h_\theta(x_j) \leq 0$ for all unsafe $x_j \in D$, wherein D denotes a data set used to learn an approximate barrier function,
      outputting the control barrier function;
      determining if the autonomous vehicle is entering an unsafe state using the control barrier function; and
      causing the autonomous vehicle to initiate a physical operation when the autonomous vehicle is in the unsafe state.

2. The method as set forth in claim 1, wherein the physical operation is a maneuver to position the autonomous vehicle into a safe state.

3. The method as set forth in claim 1, wherein minimizing the first and second loss functions includes operations of:
   minimizing the first loss function that causes the neural network $h_\theta$ to learn an approximation of an initial safety function;
   minimizing the second loss function that causes the neural network $h_\theta$ to satisfy a Bellman equation, which in turn modifies the neural network $h_\theta$, resulting in an updated approximation of the control barrier function;
   performing an iteration of minimizing the second loss function to cause the neural network $h_\theta$ to satisfy a Bellman equation, which in turn further modifies the neural network $h_\theta$, resulting in an updated approximation of the control barrier function; and
   iterating minimization of the second loss function a predetermined number of times.

4. The method as set forth in claim 1, wherein in minimizing the distinct loss function, the first loss function of $\ell_{\eta,\alpha,\delta_1,\delta_2}(\theta)$ is minimized for the discrete dynamics model and a loss function of $\ell_{\kappa,\alpha,\delta_1,\delta_2}^{cts}(\theta)$ is minimized for the continuous dynamics model.

5. The method as set forth in claim 1, wherein the discrete dynamics model is $\tau: S \times A \to S$, where S denotes a state space of the dynamical system, A denotes action space, and z denotes a transition function that yields a state of the autonomous vehicle following from an inputted state-action pair.

6. The method as set forth in claim 1, wherein the continuous dynamics model is $\dot{s} = f(s,a)$, where s denotes a state of the system, and a denotes a control action being taken, and $\dot{s}$ denotes a time derivative of s, and f denotes a vector field function that yields a time derivative of the state resulting from an inputted state-action pair.

7. A system for generating control barrier functions for ensuring safety conditions for an autonomous vehicle with state space S, action space A and trajectory data labelled as either safe or unsafe, the system comprising:
   one or more processors and a memory, the memory being a non-transitory computer-readable medium having executable instructions encoded thereon, such that upon execution of the instructions, the one or more processors perform operations of:
      receiving inputs, the inputs being a discrete or continuous dynamics model, a set of state space data points, a neural network $h_\theta$, an initial safety function L, and a method of determining an action a at a given dynamical system state s that is optimal according to the neural network $h_\theta$;

if a discrete dynamics model is part of the input, then minimizing a first loss function and a second loss function then proceeding, otherwise proceeding;

wherein the first loss function minimizes $\ell_{\delta_1,\delta_2}^{(L)}(\theta)$ such that $h_\theta \approx L$, and wherein the second loss function minimizes $\ell_{\eta,\delta_1,\delta_2}^{(H_{k-1})}(\theta)$ such that $h_\theta(s) \approx (1-\gamma)L(s)+$ $$\gamma\min\left\{L(s), \eta|h_\theta(s)| + \max_{a \in A} h_\theta(\tau(s, a))\right\},$$

with L replaced by $H_0, H_1, H_2, \ldots$, wherein $\ell$ denotes a loss function, $\delta$ denotes a fixed threshold value, $\eta$ represents a barrier function constant, k represents a number of iterations, A denotes a set of actions, $\gamma$ denotes a discount factor, and $\tau$ represents a transition function;

refining the neural network $h_\theta$ to become a control barrier function by minimizing $\ell_{\eta,\alpha,\delta_1,\delta_2}(\theta)$ such that $$(1-\eta)h_\theta(x_j) \le \max_{a \in A}(\tau(x_j, a))$$

for all instantaneously safe $x_j \in D$ such that $h_\theta(x_j) > 0$ and $h_\theta(x_j) \le 0$ for all unsafe $x_j \in D$, wherein D denotes a data set used to learn an approximate barrier function, outputting the control barrier function;

determining if the autonomous vehicle is entering an unsafe state using the control barrier function; and causing the autonomous vehicle to initiate a physical operation when the autonomous vehicle is in the unsafe state.

8. The system as set forth in claim 7, wherein the physical operation is a maneuver to position the autonomous vehicle into a safe state.

9. The system as set forth in claim 7, wherein minimizing the first and second loss functions includes operations of:

minimizing the first loss function that causes the neural network $h_\theta$ to learn an approximation of an initial safety function;

minimizing the second loss function that causes the neural network $h_\theta$ to satisfy a Bellman equation, which in turn modifies the neural network $h_\theta$, resulting in an updated approximation of the control barrier function;

performing an iteration of minimizing the second loss function to cause the neural network $h_\theta$ to satisfy a Bellman equation, which in turn further modifies the neural network $h_\theta$, resulting in an updated approximation of the control barrier function; and iterating minimization of the second loss function a predetermined number of times.

10. The system as set forth in claim 7, wherein in minimizing the distinct loss function, the first loss function of $\ell_{\eta,\alpha,\delta_1,\delta_2}(\theta)$ is minimized for the discrete dynamics model and a loss function of $\ell_{\kappa,\alpha,\delta_1,\delta_2}(\theta)$ is minimized for the continuous dynamics model.

11. The system as set forth in claim 7, wherein the discrete dynamics model is $\tau: S \times A \to S$, where S denotes a state space of the dynamical system, A denotes action space, and $\tau$ denotes a transition function that yields a state of the autonomous vehicle following from an inputted state-action pair.

12. The system as set forth in claim 7, wherein the continuous dynamics model is $\dot{s}=f(s,a)$, where s denotes a state of the system, and a denotes a control action being taken, and $\dot{s}$ denotes a time derivative of s, and f denotes a vector field function that yields a time derivative of the state resulting from an inputted state-action pair.

13. A computer program product for generating control barrier functions for ensuring safety conditions for an autonomous vehicle with state space S, action space A and trajectory data labelled as either safe or unsafe, the computer program product comprising:

a non-transitory computer-readable medium having executable instructions encoded thereon, such that upon execution of the instructions by one or more processors, the one or more processors perform operations of:

receiving inputs, the inputs being a discrete or continuous dynamics model, a set of state space data points, a neural network $h_\theta$, an initial safety function L, and a method of determining an action a at a given dynamical system state s that is optimal according to the neural network $h_\theta$;

if a discrete dynamics model is part of the input, then minimizing a first loss function and a second loss function then proceeding, otherwise proceeding;

wherein the first loss function minimizes $\ell_{\delta_1,\delta_2}^{(L)}(\theta)$ such that $h_\theta \approx L$, and wherein the second loss function minimizes $\ell_{\eta,\delta_1,\delta_2}^{(H_{k-1})}(\theta)$ such that $h_\theta(s) \approx (1-\gamma)L(s)+$ $$\gamma\min\left\{L(s), \eta|h_\theta(s)| + \max_{a \in A} h_\theta(\tau(s, a))\right\},$$

with L replaced by $H_0, H_1, H_2, \ldots$, wherein $\ell$ denotes a loss function, $\delta$ denotes a fixed threshold value, $\eta$ represents a barrier function constant, k represents a number of iterations, A denotes a set of actions, $\gamma$ denotes a discount factor, and $\tau$ represents a transition function;

refining the neural network $h_\theta$ to become a control barrier function by minimizing $\ell_{\eta,\alpha,\delta_1,\delta_2}(\theta)$ such that $$(1-\eta)h_\theta(x_j) \le \max_{a \in A}(\tau(x_j, a))$$

for all instantaneously safe $x_j \in D$ such that $h_\theta(x_j) > 0$ and $h_\theta(x_j) \le 0$ for all unsafe $x_j \in D$, wherein D denotes a data set used to learn an approximate barrier function, outputting the control barrier function;

determining if the autonomous vehicle is entering an unsafe state using the control barrier function; and causing the autonomous vehicle to initiate a physical operation when the autonomous vehicle is in the unsafe state.

14. The computer program product as set forth in claim 13, wherein the physical operation is a maneuver to position the autonomous vehicle into a safe state.

15. The computer program product as set forth in claim 13, wherein minimizing the first and second loss functions includes operations of:

minimizing the first loss function that causes the neural network $h_\theta$ to learn an approximation of an initial safety function;

minimizing the second loss function that causes the neural network $h_\theta$ to satisfy a Bellman equation, which in turn modifies the neural network $h_\theta$, resulting in an updated approximation of the control barrier function;

performing an iteration of minimizing the second loss function to cause the neural network $h_\theta$ to satisfy a Bellman equation, which in turn further modifies the neural network $h_\theta$, resulting in an updated approximation of the control barrier function; and iterating minimization of the second loss function a predetermined number of times.

16. The computer program product as set forth in claim 13, wherein in minimizing the distinct loss function, the first loss function of $\ell_{\eta,\alpha,\delta_1,\delta_2}(\theta)$ is minimized for the discrete dynamics model and a loss function of $\ell_{\kappa,\alpha,\delta_1,\delta_2}(\theta)$ is minimized for the continuous dynamics model.

17. The computer program product as set forth in claim 13, wherein the discrete dynamics model is $\tau: S \times A \to S$, where S denotes a state space of the dynamical system, A denotes action space, and $\tau$ denotes a transition function that yields a state of the autonomous vehicle following from an inputted state-action pair.

18. The computer program product as set forth in claim 13, wherein the continuous dynamics model is $\dot{s}=f(s,a)$, where s denotes a state of the system, and a denotes a control action being taken, and $\dot{s}$ denotes a time derivative of s, and f denotes a vector field function that yields a time derivative of the state resulting from an inputted state-action pair.

* * * * *